United States Patent [19]

Lohr, Jr.

[11] 4,101,507

[45] Jul. 18, 1978

[54] STABILIZATION OF POLYPHOSPHAZENES

[75] Inventor: Delmar Frederick Lohr, Jr., Akron, Ohio

[73] Assignee: The Firestone Tire & Rubber Company, Akron, Ohio

[21] Appl. No.: 779,390

[22] Filed: Mar. 21, 1977

[51] Int. Cl.$^2$ ............................................. C08K 5/34
[52] U.S. Cl. ........................... 260/45.8 N; 260/45.7 R; 260/45.75 W
[58] Field of Search ...................... 260/45.7 R, 45.8 N, 260/45.8 NW

[56] References Cited

U.S. PATENT DOCUMENTS

| | | | |
|---|---|---|---|
| 3,843,596 | 10/1974 | Kyker et al. | 260/45.7 R |
| 3,867,341 | 2/1975 | Kyker | 260/45.75 R |
| 3,972,841 | 8/1976 | Cheng et al. | 260/47 P |
| 4,017,458 | 4/1977 | Lohr, Jr. | 260/45.75 W |
| 4,026,839 | 5/1977 | Dieck et al. | 260/47 P |

*Primary Examiner*—Donald E. Czaja
*Assistant Examiner*—R. A. White

[57] ABSTRACT

Polyphosphazenes are stabilized against thermal degradation by the incorporation of a synergistic combination of certain picolinamides and a basic oxide such as MgO. In the absence of MgO from the formulation, the picolinamide is not effective as a stabilizer. A particularly preferred stabilizer is the reaction product of 3-hydroxypicolinamide and MgO.

15 Claims, No Drawings

STABILIZATION OF POLYPHOSPHAZENES

This invention relates to the protection of polyphosphazene vulcanizates from thermal degradation when exposed to temperatures up to about 500° F, in various environments such as those which may be encountered in service at elevated temperatures. More particularly, it relates to the incorporation of a synergistically active combination of additives in such polyphosphazenes to inhibit thermal degradation of the same.

Because of an attractive combination of physical and chemical properties considerable attention has recently been given to polyphosphazenes which have been described in a number of recent scientific articles and in the following U.S. Patents, among others:

| Inventor | Patent No. | Issued |
|---|---|---|
| Allcock et al. | 3,370,020 | Feb. 20, 1968 |
| Rose | 3,515,688 | June 2, 1970 |
| Reynard et al. | 3,700,629 | October 24, 1972 |
| Rose et al. | 3,702,833 | November 14, 1972 |
| Reynard et al. | 3,853,794 | December 10, 1974 |
| Reynard et al. | 3,856,712 | December 24, 1974 |
| Rose et al. | 3,856,713 | December 24, 1974 |
| Reynard et al. | 3,883,451 | May 13, 1975 |
| Cheng et al. | 3,972,841 | August 3, 1976 |

In the present specification the term polyphosphazene is intended to include the polymers described in the above noted patents and other similar materials represented by the general formula

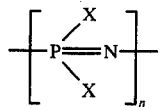

in which each X is a monovalent group such as alkoxy, substituted alkoxy including fluoroalkoxy, aryloxy, substituted aryloxy, amino, and other such groups and the several X groups may all be the same or they may differ and $n$ is an integer greater than 3 and preferably between 20 and 50,000. Some of the X groups may include some unsaturation, e.g. as described in Cheng et al. U.S. Pat. No. 3,972,841 issued Aug. 3, 1976.

Previous efforts to inhibit the thermal degradation of such polyphosphazenes have been directed to the incorporation therein of basic metal oxides or similar compounds or of metal dithiocarbamates. Metal oxides are insoluble in these polymers and hence have a relatively low level of activity. Metal dithiocarbamates are partially soluble in these polymers, but are limited in use by the fact that they promote crosslinking (gelation) on extended aging and they are incompatible with peroxide curatives. The use of metal dithiocarbamates is described and claimed in U.S. Pat. No. 3,843,596 issued Oct. 24, 1974, which also describes and claims the use of basic inorganic compounds of alkali and alkaline earth metals.

Another prior art suggestion for stabilizing polyphosphazenes against thermal degradation is set forth in U.S. Pat. No. 3,867,341 issued Feb. 18, 1975 to G. S. Kyker.

Still another system for stabilizing polyphosphazenes is described in U.S. patent application Ser. No. 661,688 filed Feb. 26, 1976, now U.S. Pat. No. 4,017,458, which describes the use of the zinc salt of 2-mercaptobenzothiazole for this purpose.

Some of these and some of the other stabilizers reported in the literature tend to impart an undesirable color, (yellow turning to brown) to the polymer, especially on prolonged exposure to sunlight.

A principal object of this invention is the protection of polyphosphazenes from thermal degradation by the addition of a combination of stabilizers which appear to act synergistically.

A further object of the invention is to stabilize polyphosphazenes against thermal degradation by means of a combination of additives which do not adversely affect vulcanization (curing) of the polymers or their physical properties, and which does not impart any noticeable color to their vulcanizates.

A further object of the invention is to provide a stabilizer which can be added to the polymer in any of the usual mixing apparatus such as mill, Brabender, or Banbury mixing or kneading, without special procedures.

These and other objects of the invention will become apparent from the description of preferred embodiments of the invention which are intended to illustrate the same and are not intended to limit the invention in any way.

In the examples which follow 100 parts by weight of polyphosphazene polymer of the general formula

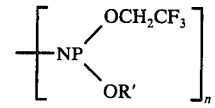

wherein OR' equals $OCH_2(CF_2)_mCF_2H$; $m$ equals 1, 3, 5, 7, 9 and in which $n$ is about 20 to 50,000 or more and all of the other additives except the peroxide curing agent were mixed for 10 minutes in a Brabender mixer. The master batch was cooled to ambient temperature and added to a 55° C mill and the peroxide curing agent was then added to the mill. After milling for a sufficient time to insure complete distribution of the curing agent, the batch was molded into slabs 6"×6"×0.05" which were then cured for 30 minutes at about 171° C. Test rings were cut from the cured slabs and aged 240 hours at 175° C. Physical properties of the aged rings were then compared to the unaged controls. Different levels of the stabilizer, 3-hydroxypicolinamide were compounded with the following composition:

| Material | Parts |
|---|---|
| Polymer | 100 |
| Silica (Quso WR 82)* | 30 |
| Magnesium Oxide | 6 |
| Peroxide (Vulcup 40 KE)** | 1.25 |
| Stabilizer | as in Table. |

*Quso WR82 is a precipitated silica containing a proprietary siloxane coating and is obtained from Philadelphia Quartz, Inc.
**Vulcup 40KE is a 40/60 mixture of α, α'-bis(t-butylperoxy) diisopropylbenzene on Burgess clay; both para and meta isomers are present in unspecified ratios; the material is obtained from Hercules, Inc.

Examples 1–9 show the effect of different levels of 3-hydroxypicolinamide with a uniform level of MgO.

TABLE I

|  | 1 | 2 | 3 | 4 | 5 | 6 | 7 | 8 | 9 |
|---|---|---|---|---|---|---|---|---|---|
| Stabilizer, phr | 0 | 0.5 | 1.0 | 1.5 | 2.0 | 2.5 | 3.0 | 3.5 | 4.0 |
| Modulus at 100% Elongation, MPa | | | | | | | | | |
| Unaged | 6.9 | 8.0 | 7.9 | 7.2 | 7.5 | 7.8 | 7.0 | 7.7 | 7.4 |
| 240 Hrs. at 175° C | 2.7 | 3.5 | 4.3 | 5.5 | 5.5 | 5.6 | 5.6 | 5.9 | 5.6 |
| Retention, % | 39 | 44 | 54 | 76 | 73 | 72 | 80 | 77 | 76 |
| Tensile Strength, MPa | | | | | | | | | |
| Unaged | 9.8 | 10.1 | 9.9 | 7.5 | 8.3 | 8.4 | 8.3 | 8.3 | 8.4 |
| 240 Hrs. at 175° C | 5.4 | 5.7 | 6.6 | 6.2 | 6.8 | 5.9 | 6.0 | 6.2 | 5.9 |
| Retention % | 55 | 56 | 67 | 83 | 82 | 70 | 72 | 75 | 70 |

In the above table the MPa values can be converted to pounds per square inch by dividing the MPa value by 0.006895.

The nature of the filler and the amount of filler is not critical and instead of a silica filler as in the Examples, a carbon black filler may be used.

The amounts of MgO which are effective in combination with the picolinamide vary from about equal parts by weight to as much as 20 times as much MgO as picolinamide by weight. A range of about 1 to 20 parts of MgO per 100 parts of polyphosphazene has been found effective with 3–10 parts per 100 parts of polymer being preferred.

In addition to 3-hydroxypicolinamide, other picolinamides with alkyl, aryl, alkoxy or halogen substituents on the pyridine ring in the 4, 5 or 6 positions, and other 3-substituted picolinamides, especially 3-hydroxythiopicolinamide and 3-mercapto thiopicolinamide exhibit the same synergism with MgO.

Corresponding amounts of ZnO have been found to behave in much the same manner as MgO and may be substituted for the MgO without departing from the intended scope of the invention.

In the absence of either MgO (or ZnO) the picolinamides are not effective as stabilizers in cured polyphosphazene, as is apparent from the data below.

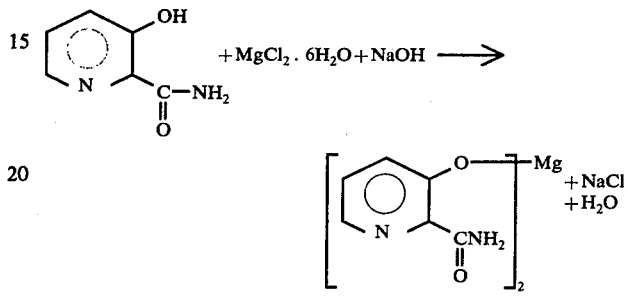

One-tenth mole (13.8 g) of 3-hydroxypicolinamide was dissolved in 300 ml water containing 4.8 g (0.11 mole) of sodium hydroxide to give a pale yellow solution. A solution of magnesium chloride hexahydrate (11.2 g, 0.055 mole, in 100 ml water) was added dropwise at ambient temperature to the above solution causing a white precipitate to form. When the addition was complete, the precipitate was collected by filtration, washed several times with water to remove occluded sodium chloride then dried under vacuum. The product weighed 16.5 g (99%) and contained two molecules of water of hydration. The structure was confirmed by

TABLE II

| EVALUATION OF 5-HYDROXYPICOLINAMIDE IN THE ABSENCE OF MAGNESIUM OXIDE | | | | | |
|---|---|---|---|---|---|
|  | A | B | C | D | E |
| Polymer (PNF-200$^R$) | 100.0 | 100.0 | 100.0 | 100.0 | 100.0 |
| Silica | 36.0 | 36.0 | 36.0 | 36.0 | 36.0 |
| MgO | 0.0 | 0.0 | 0.0 | 0.0 | 0.0 |
| 3-Hydroxypicolinamide | 0.0 | 0.5 | 1.0 | 1.5 | 2.0 |
| Peroxide (Vulcup 40 KE) | 1.25 | 1.25 | 1.25 | 1.25 | 1.25 |
| Modulus at 100% Elongation, MPa | | | | | |
| Unaged | 7.3 | 5.7 | 6.5 | 6.6 | 5.4 |
| 240 Hrs. at 175° C | 4.6 | 3.3 | 3.6 | 3.4 | 2.8 |
| Retention % | 63 | 58 | 55 | 52 | 52 |
| Tensile Strength, MPa | | | | | |
| Unaged | 8.3 | 9.0 | 9.1 | 9.5 | 8.0 |
| 240 Hrs. at 175° C | 7.1 | 6.4 | 6.7 | 6.3 | 5.8 |
| Retention % | 86 | 71 | 74 | 66 | 73 |

While not wishing to be bound as to how the MgO and picolinamide cooperate in stabilizing the polymer, it has been found that stabilization is also achieved by the use of the magnesium compound of the picolinamide, and such is a preferred stabilizer in the present invention.

The magnesium bis(3-oxypicolinamide) is prepared as follows:

elemental and mass spectral analyses. The product became a bright yellow above 300° C and underwent a reduction in volume above 330° C but did not melt below 370° C.

Polyphosphazene polymer was mixed, molded and tested as in the preceding examples except that the stabilizer was the magsium picolinamide. The results were as shown in the following table.

TABLE III

| EVALUATION OF MAGNESIUM BIS(3-OXYPICOLINAMIDE) IN POLYFLUOROOPHOSPHAZENE VULCANIZATE | | | | | |
|---|---|---|---|---|---|
|  | A | B | C | D | E |
| Polymer (PNF-200$^R$) | 100.0 | 100.0 | 100.0 | 100.0 | 100.0 |
| Silica (Quso WR 82) | 30.0 | 30.0 | 30.0 | 30.0 | 30.0 |
| MgO | 6.0 | 6.0 | 6.0 | 6.0 | 6.0 |

TABLE III-continued
EVALUATION OF MAGNESIUM BIS(3-OXYPICOLINAMIDE) IN POLYFLUOROOPHOSPHAZENE VULCANIZATE

|  | A | B | C | D | E |
|---|---|---|---|---|---|
| Vulcup 40 KE | 1.15 | 1.15 | 1.15 | 1.15 | 1.15 |
| Stabilizer | — | 1.0 | 2.0 | 3.0 | 4.0 |
| Modulus at 100% Elongation, MPa | | | | | |
| Unaged | 7.3 | 6.8 | 6.6 | 6.7 | 6.3 |
| 240 Hrs. at 175° C | 4.0 | 4.5 | 5.9 | 6.5 | 7.1 |
| Retention % | 54 | 66 | 89 | 97 | 113 |
| Tensile Strength, MPa | | | | | |
| Unaged | 9.2 | 8.4 | 7.9 | 7.8 | 8.3 |
| 240 Hrs. at 175° C | 6.8 | 7.5 | 8.7 | 8.1 | 8.0 |
| Retention % | 74 | 89 | 110 | 104 | 96 |

The mixing, molding and test conditions were identical to those described in the disclosure.

In the preceding examples, the polyphosphazene utilized in the formulation was one in which the substituent groups were trifluoroethoxy ($-OCH_2CF_3$) and telomer fluoroalkoxy [$-OCH_2(CF_2)_m-CF_2H$] as described in Rose U.S. Pat. No. 3,515,688, the ratio between the two being about 70/30 on a mol % basis. The polymer contained phosphazenes with $n$ from 20 to 50,000, the molecular weight distribution being similar to that described in Table III of a paper published in the Journal of Polymer Science Vol. 14 pages 1379–1395 (1976) by D. W. Carlson et al.

Having now described preferred embodiments of the invention in accordance with the Patent Statutes, it is not intended that it be limited except as may be required by the appended claims.

What is claimed is:

1. A poly(phosphazene) composition stabilized against thermal aging comprising (1) a poly(phosphazene) represented by the general formula:

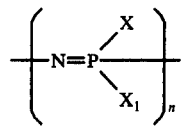

wherein $n$ represents an integer from 20 up to about 50,000 and X and $X_1$ each represent a monovalent substituent selected from the group consisting of alkoxy, substituted alkoxy, aryloxy, substituted aryloxy, hydroxy, and amino, and X and $X_1$ are randomly distributed along the $-P=N-$ backbone, and (2) a stabilizer consisting of an organic compound compatible with said poly(phosphazene) and present in an amount sufficient to stabilize said poly(phosphazene) against thermal degradation, said organic compound being selected from the group consisting of substituted picolinamides and substituted thiopicolinamides wherein the substituents are selected from the group consisting of hydroxy, alkyl, aryl, alkoxy and halogen and an amount of a basic oxide sufficient to render said picolinamide effective as a stabilizer, and said basic oxide is selected from the group consisting of MgO and ZnO.

2. A composition according to claim 1 wherein the picolinamide or thiopicolinamide is present in an amount between 0.05 and 5.0% by weight.

3. The stabilized poly(phosphazene) composition of claim 1 wherein X and $X_1$ are fluoroalkoxy or fluoroaryloxy groups.

4. The composition of claim 1 wherein the basic oxide is MgO.

5. The composition of claim 4 with between 1 and 20 times as much MgO as picolinamide by weight and the amount of MgO is in the range between 1 and 20 parts by weight of said polyphosphazene.

6. The composition of claim 4 wherein the picolinamide is 3-hydroxypicolinamide.

7. Elastomers consisting essentially of the stabilized polyphosphazenes of claim 1.

8. Plastics consisting essentially of the stabilized polyphosphazenes of claim 1.

9. Thermoplastic elastomers consisting essentially of the stabilized polyphosphazenes of claim 1.

10. Fibers consisting essentially of the stabilized polyphosphazenes of claim 1.

11. Vulcanized articles consisting essentially of the stabilized polyphosphazenes of claim 1.

12. Peroxide cured polyphosphazene compositions of claim 1 in which from 0.2 to 5.0 percent of the groups X or $X_1$ are unsaturated.

13. The compositions of claim 12 in which the groups X are $OCH_2CF_3$ and the groups $X_1$ are mixtures of $OCH_2(CF_2)_yCF_2H$ and $OC_6H_4CH_2CH=CH_2$ in which $y$ is either 1, 3, 5, 7 or 9, and mixtures thereof.

14. The composition of claim 13 in which the ratio of X to $X_1$ is from 95 to 5 and from 50 to 50 and which contains in addition from 0.2 to 5.0 mol % o-allylphenoxy groups.

15. The composition of claim 1 wherein the stabilizer is magnesium bis(3-oxypicolinamide).

* * * * *